US006681485B2

(12) United States Patent
Lippert

(10) Patent No.: US 6,681,485 B2
(45) Date of Patent: Jan. 27, 2004

(54) METHOD FOR CASTING A PISTON FOR A RECIPROCATING INTERNAL COMBUSTION ENGINE

(75) Inventor: Eduard Lippert, Calberlah (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 10/204,025

(22) PCT Filed: Feb. 1, 2001

(86) PCT No.: PCT/EP01/01077

§ 371 (c)(1),
(2), (4) Date: Aug. 15, 2002

(87) PCT Pub. No.: WO01/63112

PCT Pub. Date: Aug. 30, 2001

(65) Prior Publication Data

US 2003/0009882 A1 Jan. 16, 2003

(30) Foreign Application Priority Data

Feb. 24, 2000 (DE) .......................... 100 08 559

(51) Int. Cl.⁷ ................................. B23P 15/00
(52) U.S. Cl. ............................ 29/888.047; 29/888.04; 164/4.1; 164/457
(58) Field of Search ............... 164/4.1, 457; 29/888.04, 29/888.047, 407.05, 407.01, 557, 888.05; 123/193.6; 92/208, 172

(56) References Cited

U.S. PATENT DOCUMENTS

| 4,847,964 A | | 7/1989 | Adams et al. |
| 5,063,894 A | * | 11/1991 | Mielke et al. ........... 123/193.6 |
| 5,323,837 A | | 6/1994 | Stuummer |
| 5,379,680 A | * | 1/1995 | Bohm et al. .................. 92/208 |
| 5,605,126 A | | 2/1997 | Hofmann et al. |
| 5,983,856 A | | 11/1999 | Oda et al. |
| 6,076,506 A | * | 6/2000 | Berlinger et al. ....... 123/46 SC |
| 2003/0075042 A1 | * | 4/2003 | Gaiser et al. .................. 92/231 |
| 2003/0075137 A1 | * | 4/2003 | Gaiser ..................... 123/193.6 |

FOREIGN PATENT DOCUMENTS

| DE | 41 32 002 | 4/1993 |
| GB | 2 191 964 | 12/1987 |
| JP | 6-82342 | 3/1994 |
| JP | 10 317 974 | 12/1998 |

* cited by examiner

Primary Examiner—I Cuda-Rosenbaum
(74) Attorney, Agent, or Firm—Ostrolenk, Faber, Gerb & Soffen, LLP

(57) ABSTRACT

A process for producing pistons for a reciprocating internal combustion engine by casting, the process including the steps of determining for at least a first piston of a casting process batch, a volume $V_{actual}$ formed by a surface of the piston that faces a combustion chamber of the engine, comparing the volume $V_{actual}$ with a desired nominal volume $V_{nominal}$, and, based on this comparison, fixing a compression height $K_H$ so that its deviation from a set point ensures that, subsequently $V_{actual}=V_{nominal}$ within tolerance limits.

7 Claims, 1 Drawing Sheet

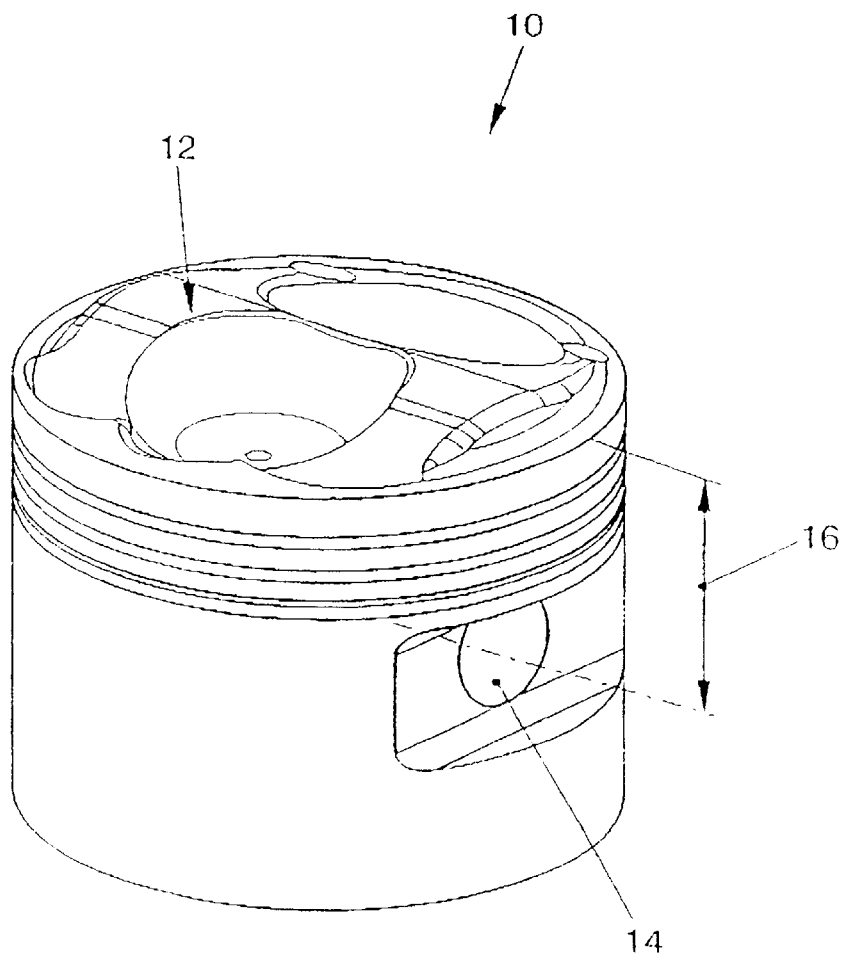
FIG.

METHOD FOR CASTING A PISTON FOR A RECIPROCATING INTERNAL COMBUSTION ENGINE

PRIORITY CLAIM

This is a U.S. national stage of application No. PCT/EP01/01077, filed on Feb. 1, 2001. Priority is claimed on that application and on the following application:
Country: Germany, Application No.: 100 08 59.8, Filed: Feb. 24, 2000.

BACKGROUND OF THE INVENTION

The invention concerns a process for producing pistons for a reciprocating internal combustion engine, especially an Otto engine with direct injection and especially a motor vehicle engine, in which e piston is produced by a casting process.

SUMMARY OF THE INVENTION

In the manufacture of reciprocating internal combustion engines, variations in pistons produced by casting lead to corresponding deviations in the desired piston displacement and the compression ratio $\epsilon$. For example, for $\epsilon=11$, tolerances of 0.5 are normal. In the case of pistons with a smooth surface of the face of the piston that faces the combustion chamber, tolerances from the casting process can be compensated by mechanical finishing. However, this is no longer possible in the case of pistons with a fissured surface, which encompass, for example, depressions and elevations for suitably influencing an injection process in Otto engines with direct injection. In pistons of this type, a significant portion of the surface of the piston that faces the combustion chamber remains as a cast surface. Therefore, the volume in the cylinder that is determined by the surface of the piston facing the combustion chamber is subject to large variations corresponding to the large tolerances in the casting process. However, this has an unfavorable effect on engine function. For example, exhaust gas temperature, pollutant emission, and fuel consumption may rise.

SUMMARY OF THE INVENTION

Therefore, the goal of the present invention is to develop a process of the type referred to above, in which the cited disadvantages are overcome, and the tolerances for piston displacement and compression ratio are reduced to the smallest possible values.

To this end, the invention provides that, at least for the first piston of a casting process batch, the volume $V_{actual}$ formed by the surface of the piston that faces the combustion chamber is determined, that this volume $V_{actual}$ is compared with the desired nominal volume $V_{nominal}$, and that, based on this comparison, the compression height $K_H$ is fixed in such a way that its deviation from a set point ensures that, subsequently, $V_{actual}=V_{nominal}$ within tolerance limits.

This has the advantage of achieving very small variation with respect to the compression ratio, since, for each batch, the piston pin bore is formed accordingly, i.e., at a different place in the piston, so that any deviations that may be present after the casting process due to variations in the volume of the piston defined by the combustion-chamber face are compensated with the compression height.

After a batch of pistons has been cast, it is advantageous to form the piston pin bore in all of the pistons at a predetermined distance $K_H$ from the surface of the pistons. This is done by machining the pistons, e.g., by milling.

In a preferred embodiment, the volume is determined by immersing the piston with its combustion-chamber face into a liquid cushion and measuring the displacement, which is then used to calculate the volume of the combustion-chamber face.

The pistons produced in the casting process have a fissured surface or depressions and elevations of the face of the piston that faces the combustion chamber. Therefore, a significant portion of the surface of the piston that faces the combustion chamber cannot be suitably mechanically finished, so this surface remains a rough, unfinished cast surface.

Additional features, advantages and advantageous refinements of the invention are described and in the following description of the invention with reference to the sole attached drawing, which shows a piston for a reciprocating internal combustion engine.

DESCRIPTION OF THE PREFERRED EMBODIMENTS

The piston 10 shown in the drawing has a surface 12 that faces the combustion chamber. This surface defines a corresponding volume. In addition, the piston 10 has a piston pin bore 14. The compression height $K_H$ is the distance 16 from the piston pin bore 14 to the surface 12 of the piston. The invention provides that the first piston of a batch of pistons produced in a casting process be measured in such a way as to determine the volume formed by the face of the piston facing the combustion chamber. This volume results in a corresponding deviation in the compression volume of the piston 10 after it has been installed in a cylinder. To compensate for this deviation, the compression height $K_H$ is determined in such a way that, despite the deviating volume with respect to the surface of the piston that faces the combustion chamber, the desired compression ratio is produced as exactly as possible. After the piston has been cast, the piston is machined to form the piston pin bore 14 at the appropriate place in the piston 10.

In accordance with the invention, after the first piston has been measured and production work has begun on this batch of pistons with the fixed value for the compression height $K_H$, every x-th piston is removed during the production process to check $K_H$ and, if necessary, to correct it.

What is claimed is:
1. A process for producing pistons for a reciprocating internal combustion engine by casting, the process comprising the steps of: determining for at least a first piston of a casting process batch a volume $V_{actual}$ formed by a surface of the piston that faces a combustion chamber of the engine; comparing the volume $V_{actual}$ with a desired nominal volume $V_{nominal}$; and, based on this comparison, fixing a compression height $K_H$ so that its deviation from a set point ensures that, subsequently $V_{actual}=V_{nominal}$ within tolerance limits.

2. A process in accordance with claim 1, and further comprising the step of forming a piston pin bore in each of the pistons at a predetermined distance $K_H$ from the surface of the piston after a batch of pistons has been cast.

3. A process in accordance with claim 2, including forming the piston pin bore by machining.

4. A process in accordance with claim 3, including forming the piston pin bore by milling.

5. A process in accordance with claim 1, wherein the volume determining step includes immersing the piston with its combustion-chamber face into a liquid cushion and measuring displacement, and using the displacement to calculate the volume of the combustion-chamber face.

6. A process in accordance with claim 1, including producing pistons with a fissured surface or with depressions and elevations of the face of the piston that faces the combustion chamber.

7. A process in accordance with claim 1, wherein a significant portion of the surface of the piston that faces the combustion chamber remains a rough, unfinished cast surface.

* * * * *